(12) United States Patent
Carloni et al.

(10) Patent No.: US 6,895,253 B1
(45) Date of Patent: *May 17, 2005

(54) WIRELESS INDOOR COMMUNICATIONS USING ANTENNA ARRAYS

(75) Inventors: Manuel Joseph Carloni, Holmdel, NJ (US); Michael James Gans, Monmouth Beach, NJ (US); Reinaldo A. Valenzuela, Holmdel, NJ (US); Jack Harriman Winters, Middletown, NJ (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1826 days.

(21) Appl. No.: 08/404,406

(22) Filed: Mar. 14, 1995

(51) Int. Cl.[7] .................................................. H04B 15/00
(52) U.S. Cl. ...................... 455/506; 455/25; 455/277.1; 455/562.1
(58) Field of Search ................................. 455/33.1, 33.3, 455/54.1, 101, 133, 277.1, 277.2, 134, 135, 65, 422, 562.1, 517, 52.3, 25, 504, 506; 375/347; 342/367, 74, 148, 60, 77

(56) References Cited

U.S. PATENT DOCUMENTS

| | | | |
|---|---|---|---|
| 3,917,998 A | 11/1975 | Welti | 325/3 |
| 4,128,740 A | * 12/1978 | Graziano | 455/562 |
| 4,217,586 A | 8/1980 | McGuffin | |
| 4,316,192 A | 2/1982 | Acoraci | 343/100 SA |
| 4,596,986 A | 6/1986 | Andrews et al. | 343/373 |
| 4,789,983 A | 12/1988 | Acampora et al. | 370/96 |
| 4,797,947 A | * 1/1989 | Labedz | 455/33.3 |
| 4,882,588 A | 11/1989 | Renshaw et al. | 342/373 |
| 4,951,061 A | 8/1990 | Lee | 342/373 |
| 4,975,926 A | 12/1990 | Knapp | 375/1 |
| 5,086,302 A | 2/1992 | Miller | 342/373 |
| 5,089,823 A | 2/1992 | Vasile | 342/383 |
| 5,095,535 A | * 3/1992 | Freeburg | 455/278 |
| 5,134,417 A | 7/1992 | Thompson | 342/375 |
| 5,303,240 A | * 4/1994 | Borras et al. | 370/95.3 |
| 5,329,555 A | * 7/1994 | Marko et al. | 375/100 |
| 5,446,922 A | * 8/1995 | Siwiak et al. | 455/277.2 |
| 5,507,035 A | * 4/1996 | Bantz et al. | 455/133 |
| 5,628,052 A | * 5/1997 | DeSantis et al. | 455/33.3 |
| 5,701,583 A | * 12/1997 | Harbin et al. | 455/25 |

FOREIGN PATENT DOCUMENTS

EP     0 352 787      1/1990

OTHER PUBLICATIONS

EPO Communication, dated Jun. 4, 1999.
Wireless In–Building Network Architecture and Protocols, publication date Jun. 14, 1992, by Dale Buchholz, Paul Odlyzko, Mark Taylor and Richard White.

(Continued)

Primary Examiner—Lee Nguyen

(57) ABSTRACT

A wireless communication system and method includes antenna arrays at both the transmitter and receiver having a plurality of elements for very high data rate communication. Phased array antennas or directive fixed beam antennas are used with a beamwidth in azimuth and elevation less than 30° to increase the power margin and to decrease the delay spread of signals at the receiver to permit wireless data communications at high data rates in closed environments, for example, bursty transmissions and isochronous communications. The wireless communication system is capable of data transmission rates which exceed 1 Gbps with propagation losses of up to at least 60 dB relative to one meter.

21 Claims, 6 Drawing Sheets

OTHER PUBLICATIONS

First Implementation of an Operating 256 QAM 400 Mb/s Microwave Radio System by Hiroyuki Kawahara and Takehiro Murase.

D.M.J. Devasirvatham, "Time Delay Spread Measurements of Wideband Radio Signals Within A Building", Electronics Letters, vol. 20, No. 23, Nov. 8, 1984, pp. 950–951.

P.F. Driessen, "High Speed Indoor Wireless Systems With Directional Antennas", Proceedings of VTC '94, Stockholm, Sweden, Jun. 7–10, 1994, pp. 664–668.

T.A. Freeburg, "Enabling Technologies for Wireless In–Building Network Communications—Four Technical Challenges, Four Solutions", IEEE Communications Magazine, Apr. 1991, pp. 58–64.

M.J. Gans et al., "A 2.5 Gigabit 23–Mile Radio Link for LuckyNet", Proceedings of Globecom '91, Dec. 2–5, 1991, pp. 1065–1068.

J.D. Kraus, ANTENNAS, McGraw–Hill: New York, 1950, pp. 25, 54, and 56.

A.A.M. Saleh et al., "A Statistical Model for Indoor Multipath Propagation", IEEE Journal on Selected Areas in Communications, vol. SAC–5, No. 2, Feb. 1987, pp. 128–137.

H. Taub et al., Principles of Communication Systems, McGraw–Hill, New York, 1971, pp. 380–381 and pp. 490–491.

R.A. Valenzuela, "A Ray Tracing Approach to Predicting Indoor Wireless Transmission", Proceedings of VTC '93, Secaucus, New Jersey, May 18–20, 1993, pp. 214–218.

* cited by examiner

WIRELESS INDOOR COMMUNICATIONS USING ANTENNA ARRAYS

BACKGROUND OF THE INVENTION

1. Field of the Invention

This disclosure relates to wireless communication systems, and in particular to a wireless communication system including antenna arrays at both the transmitter and receiver for very high data rate communication.

2. Description of the Related Art

The use of wireless transmission techniques for data and voice communications within closed environments, for example, office buildings, frees users from the necessity of installing cables, bridges, routers, hubs, etc. which interconnect the various data and voice communication equipment. In addition, the elimination of interconnecting cables increases the flexibility of the equipment by facilitating changes in existing equipment configurations, as well as the addition of new equipment without the costly rewiring expenses. However, indoor wireless communications at very high data rates, for example, rates in excess of 10 Megabit per second (Mbps) up to multi-Gigabit per second (Gbps), present technical obstacles affecting the signal integrity. Specifically, signal power margin may be reduced and multipath delay spread may be present.

Wireless communication systems have been developed implementing various transmission techniques to achieve indoor wireless communications at high data rates on the order of Mbps. For example, cordless radio telephone systems have been implemented which permit telephones to communicate via radio to a localized antenna connected to a base station. Infrared communication systems for transmitting two way data communications in the infrared spectrum have also been developed.

More recently, a wireless system for wideband indoor communications using radio as the transmission medium is presented in U.S. Pat. No. 4,789,983 to Acampora et al. The communication system described therein includes a plurality of transceivers associated with separate users of the system, and a central node capable of providing duplex communications using a wireline connection and a radio channel with certain subgroups of transceivers.

Other wireless systems are presented in T. A. Freeburg, "Enabling Technologies for Wireless In-Building Network Communications—Four Technical Challenges, Four Solutions", IEEE COMMUNICATIONS MAGAZINE, April 1991, pp. 58–64. In T. A. Freeburg, supra at p. 63, a system using six equal 60° azimuth directional antennas with a single elevational beamwidth coverage to operate at 15 Mbps for both transmit and receive. Such a large beamwidth of 60° azimuth and a single elevational beamwidth coverage are used to achieve a required gain.

Such indoor communications techniques do not overcome the signal power margin and multipath delay spread phenomena encountered at data rates of tens of Mbps to data rates in excess of 1 Gbps.

SUMMARY

A wireless communication system and method including antenna arrays at both the transmitter and receiver are disclosed for very high data rate communication. In an illustrative embodiment, phased array antennas or directive fixed beam antennas are used with a beamwidth in azimuth and elevation of less than 30° to increase the power margin and to decrease the delay spread of signals at the receiver to permit wireless data communications at high data rates in closed environments including between rooms, for example, bursty transmissions and isochronous communications. The illustrative embodiment is capable of data transmission rates which exceed 1 Gbps with propagation losses up to at least 60 dB relative to one meter.

The illustrative embodiment includes at least one device or unit including an antenna array having a plurality of array elements, and a processor operatively connected to the antenna array for determining a suitable communication path between the at least one unit with respect to predetermined communications conditions for typical data rates in excess of one Gbps.

BRIEF DESCRIPTION OF THE DRAWINGS

The features of the exemplary embodiment of a wireless communication system and method will become more readily apparent and may be better understood by referring to the following detailed description of an illustrative embodiment of the present invention, taken in conjunction with the accompanying drawings, where.

DESCRIPTION OF THE PREFERRED EMBODIMENTS

Figure 1:
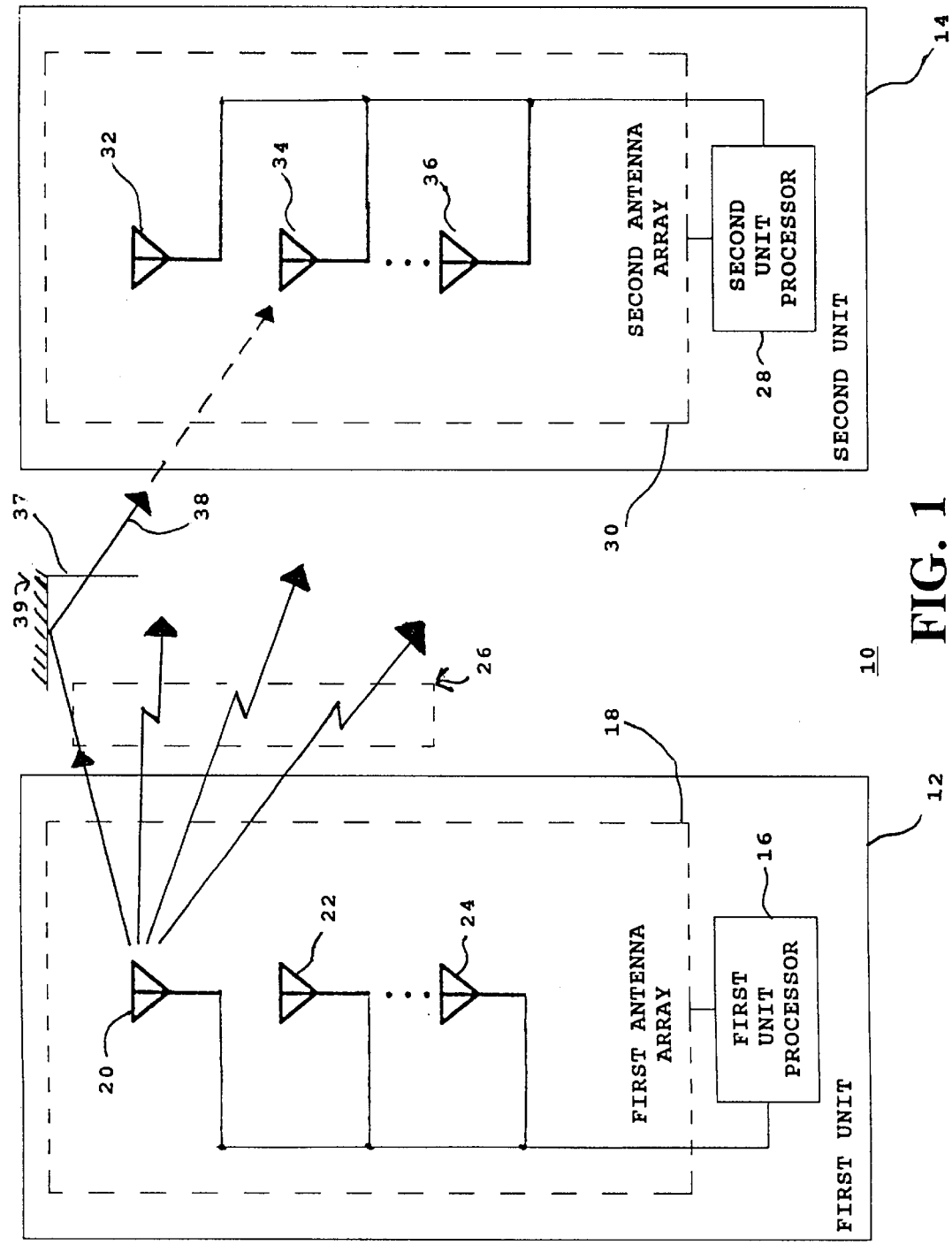
FIG. 1 illustrates the exemplary embodiment of a wireless communications system using antenna arrays.

Referring now in specific detail to the drawings, with like reference numerals identifying similar or identical elements, as shown in FIG. 1, the preferred embodiment is a wireless communication system and method including antenna arrays at both the transmitter and receiver for very high data rate communication. Such a wireless communication system and method may be used in indoor settings, such as within and between rooms in a building.

The preferred embodiment uses phased array antennas or directive fixed beam antennas to increase the power margin and to decrease the delay spread of signals at the receiver to isolate a single multipath ray, and thereby to permit wireless data communications at high data rates in closed environments, for example, bursty transmissions and isochronous communications. Typical embodiments of the present invention may be capable of data transmission rates which exceed 1 Gbps with propagation losses up to at least 60 dB relative to one meter.

As illustrated in FIG. 1, system 10 includes a first unit 12 and at least one second unit 14 for establishing communications therebetween. In an exemplary embodiment, each of the first unit 12 and the second unit 14 may be either a base station or a remote station. The first unit 12 includes a first unit processor 16 operatively connected to a first antenna array 18 having a plurality of array elements 20, 22, 24 for transmitting signals 26 to the at least one second unit 14. Each at least one second unit 14 includes a respective second processor 28 which is operatively connected to a second antenna array 30 having a plurality of array elements 32, 34, 36. The second unit 14 receives the signals 26 at the second antenna array which passes the received signals 26 to the second processor 28. The system 10 preferably transmits and receives such signals 26 according to the method shown in FIG. 2 to determine a best or suitable communication path 38 meeting the required signal power and delay of received signals 26 as discussed below. For example, the best or suitable communication path in the illustrative scenario of FIG. 1 is depicted as propagating from antenna array element 20 of the first antenna array 18 to antenna array element 34 of the second antenna array 30. For example, the best or suitable communication path or ray is reflected off wall 39 and passed through wall 37.

Figure 2:
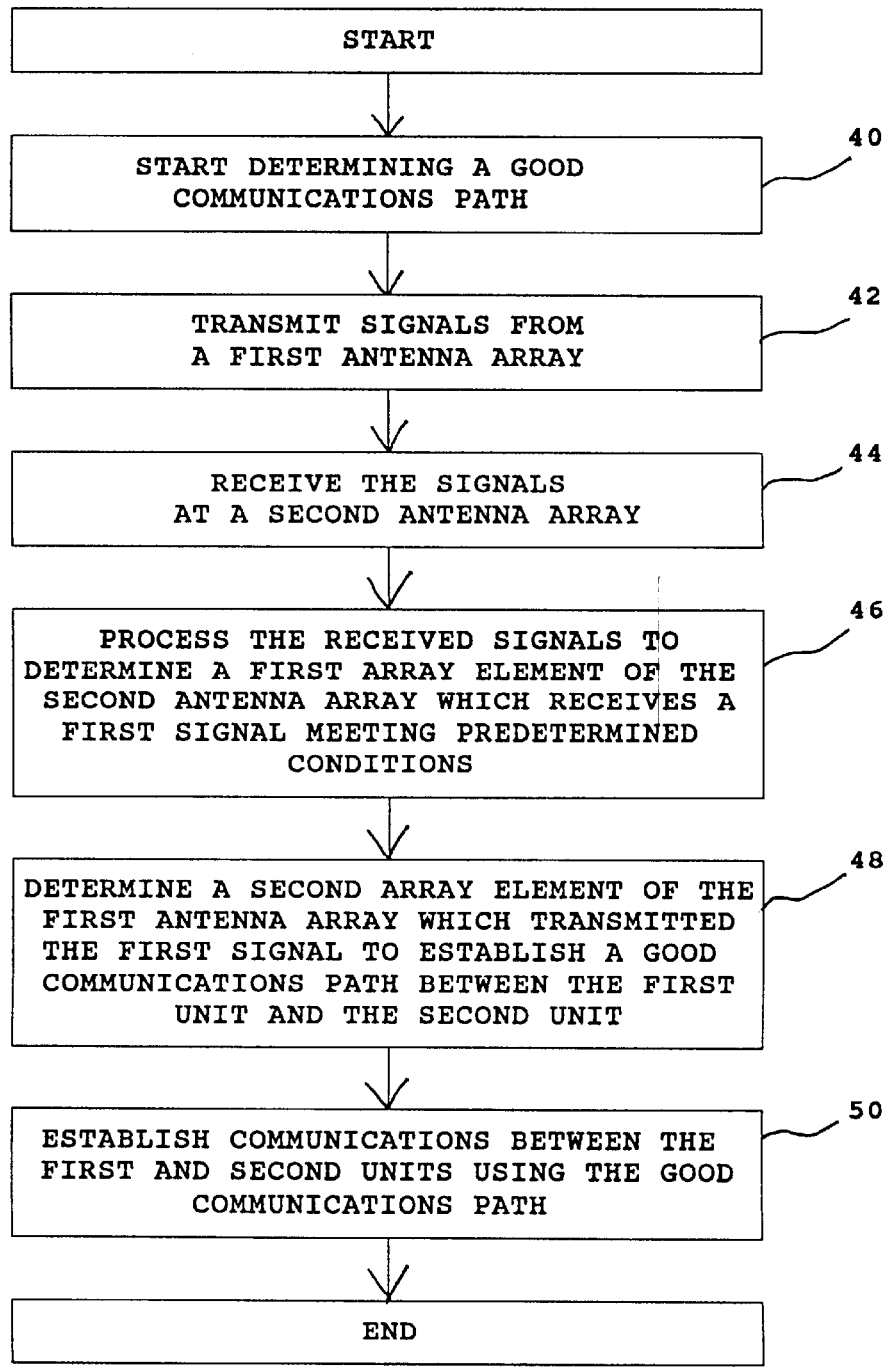
FIG. 2 illustrates an exemplary method of operation of the wireless communications system.

As shown in FIG. 2, the method of the preferred embodiment includes the steps of starting to determine the best or suitable communication path for wireless communications, which isolates a single multipath ray, in step 40; transmitting the signals 26 from the first antenna array 18 in step 42; receiving the signals 26 at the second antenna array 14 in step 44; processing the received signals 26 at the second processor 28 in step 46 to determine a first array element 34 of the second antenna array which receives at least a first signal 38 meeting predetermined conditions according to the required power and delay profile; determining a second array element 20 of the first antenna array in step 48 which transmitted the first signal 34 to establish a best or suitable communication path 38 between the first unit 12 and the second unit 14; and establishing communications between the first and second units 12, 14 using the best or suitable communication path 38 in step 50.

Figure 3:
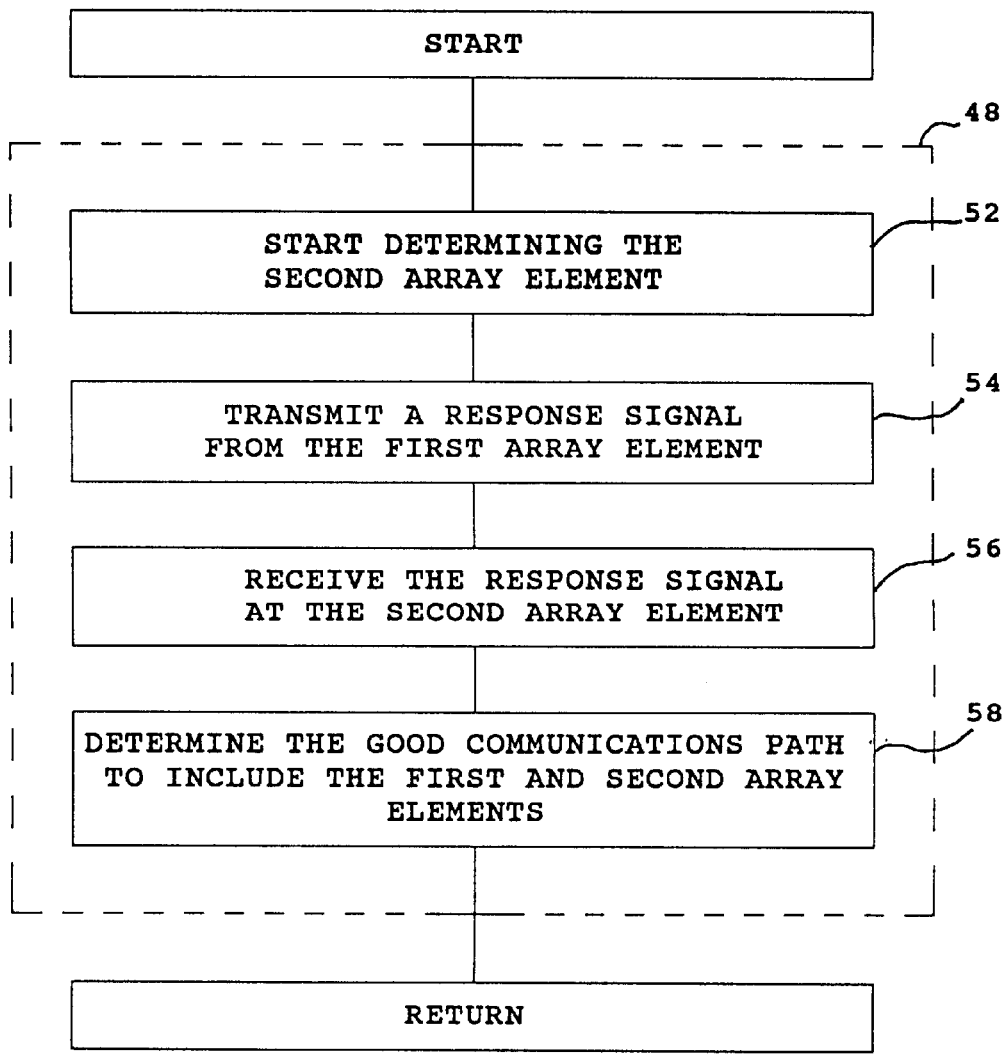
FIG. 3 illustrates a step of the exemplary method for determining a best or suitable communication path.

In the exemplary embodiment, as shown in FIG. 3, the step of determining the second array element 20 in step 48 in FIG. 2 may include the steps of starting to determine the second array element in step 52; transmitting from the first array element 34 a response signal to the first unit 12 in step 54; receiving the response signal at the second array element 20 in step 56; and determining the best or suitable communication path 38 as including the first and second array elements 34, 20, respectively, in step 58.

Figure 4:
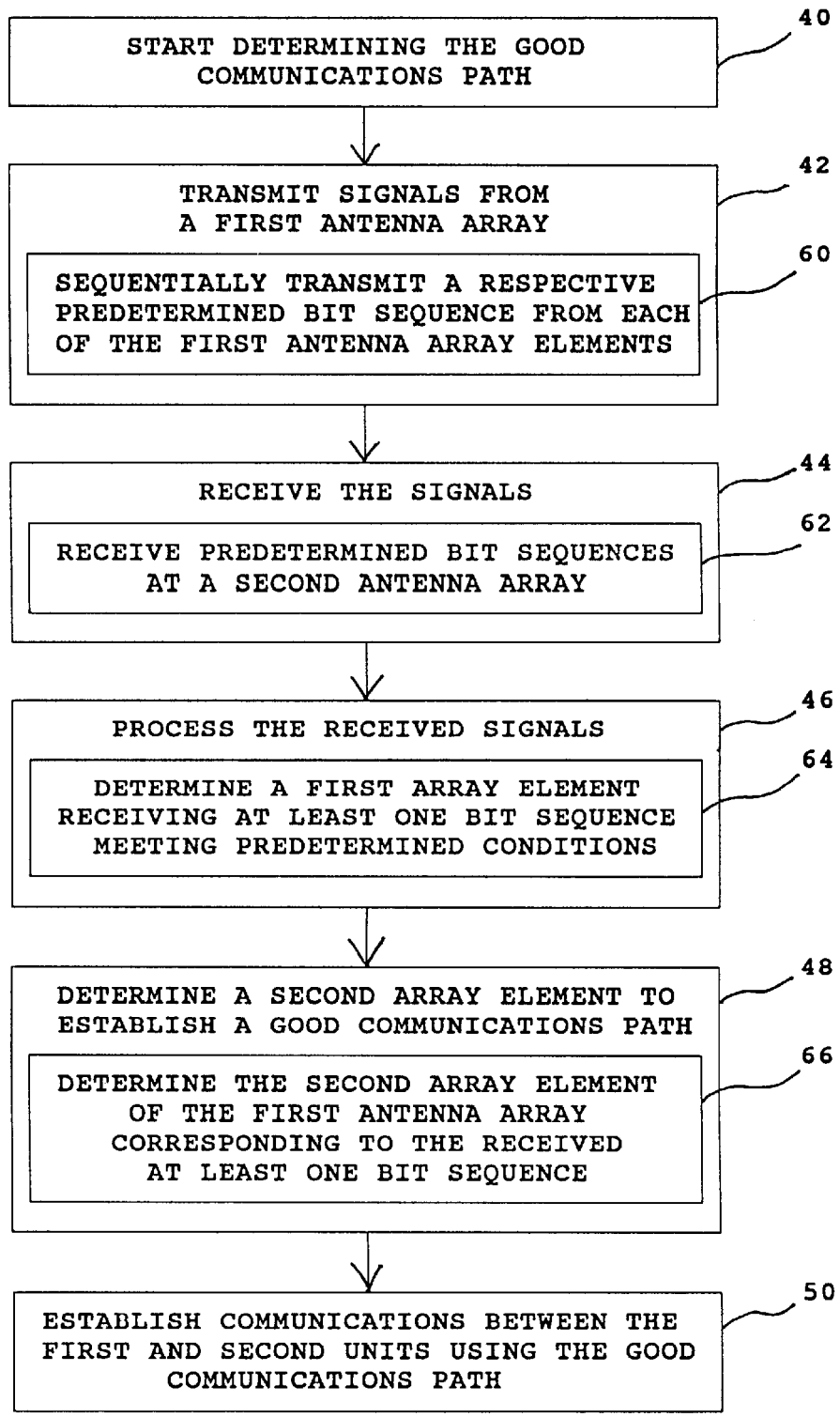
FIG. 4 illustrates an alternative method of operation using sequentially transmitted bit sequences.

In an alternative embodiment, as shown in FIG. 4, the method of FIG. 2 may include additional steps where the step 42 of transmitting the signals 26 from the first antenna array 18 includes sequentially transmitting a respective predetermined bit sequence from each of the first antenna array elements 20–24 in step 60; the step of receiving in step 44 includes the step of receiving the predetermined bit sequences at each of the second antenna array elements in step 62; the step of processing the received signals in step 46 includes the step of determining in step 64 a first antenna array element of the second antenna array which receives at least one bit sequence meeting predetermined signal propagation conditions, including required power and delay profile; and the step of determining in step 48 includes the step of determining in step 66 a second array element of the first antenna array corresponding to the received at least one bit sequence, to establish a best or suitable communication path between the first unit and the second unit in step 50.

Figure 5:
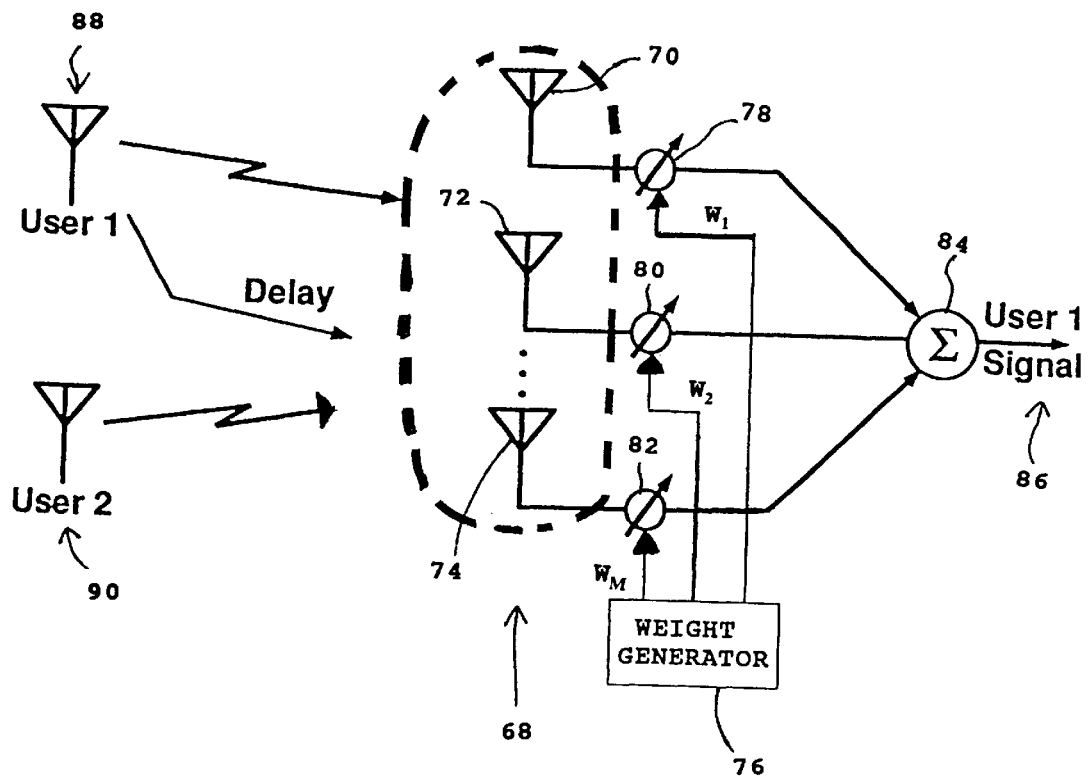
FIG. 5 illustrates an adaptive antenna array.

In an alternative embodiment, at least one of the first unit 12 and the second unit 14 may include an adaptive array 68 as shown in FIG. 5, such as an electronically steerable array and/or an array having array elements 70–74 which, in this case, have overlapping coverage, for example, omnidirectional antenna elements. The received signals are weighted using weights $W_1, W_2, \ldots W_M$ generated by a weight generator 76 in a manner known in the art. For such adaptive arrays using weighted signals, the weight generator 76 applies the weights to each respective signal from the antenna array elements 70–74. In particular, the received signals are in the complex domain, having an amplitude and a phase, and the weights $W_1, W_2, \ldots W_M$, which are preferably or typically complex numbers, are applied to the complex domain signals in a manner known in the art, such as by mixers 78–82, to generate weighted signals which are summed by adder 84 to generate a received signal 86. By weighting the signals received therefrom, the resultant antenna reception configuration or profile provides an increased reception profile for USER1 88, and which has a notch or a reduced reception profile for USER2 90, which is transmitting an interfering signal.

The above exemplary embodiments are applicable to provide high data rate indoor wireless communications: for example, wireless communications on an entire floor of an office building, with a single base station and at least one remote unit communicating up to multiple Gbps rates. The exemplary embodiment determines which pairs of transmit and receive antennas for the fixed-beam array (or pairs of weights for the adaptive array) with a plurality of elements to isolate a single ray for very high data rate communication for communication between the first and second units, for example, a base station and a remote. Once a suitable communication path is determined, the preferred embodiment also determines which units have data to transmit and determine a schedule for transmissions, in a manner known in the art.

Such high data rates generally depend on the received signal power margin and the delay spread. Previous typical measurements of several office buildings have determined that the maximum propagation loss for a single floor is typically 60 dB, relative to 1 meter and averaged over the multipath fading, and the root mean square (RMS) delay spread is typically on the order of 100 nanoseconds (ns). Such delay spread limits the maximum data rate to about 1 Mbps without an antenna array. In addition, most movement within a building is typically less than 3 mph, so the fading rate within a building would be, for example, 80 Hz at 19 GHz.

The use of antenna arrays in embodiments of the present invention typically increases the power margin and decreases the delay spread of the signal at a receiver, and therefore enables data rates in excess of 1 Gbps by a best or suitable communication path determined from the antenna arrays, with an overhead of less than 10% to determine the best or suitable communication path, and with bursty traffic and data including continuous video and/or voice signals being transmitted. The tracking of the best pair of antennas is described below.

An antenna pair update rate preferably has about 10 times the fading rate to track the fading, so updates are preferably required to be done about once every millisecond with operation at 19 GHz or higher. With a 100 ns delay spread, such bit sequences are at least 200 ns in duration and are transmitted sequentially to determine the channel characteristics for each transmit/receive antenna pair. From such a bit sequence, the receiver determines the receive signal power and the "eye opening"; i.e. the distortion due to delay spread. For example, with two antenna arrays each having 50 array elements, there are 2500 possible pairs of transmit/receive antenna pairs, where the exemplary embodiment determines an array pair with a single isolated ray of sufficient power as a best or suitable communication path. In particular, for a base station sequentially transmitting bit sequences of 200 ns in duration from each of the 50 transmit antenna array elements to a plurality of remotes, each remote receives each bit sequence with all 50 receive antenna array elements, and determines the receive signal power and distortion for each antenna using the respective unit processor of each remote. After 10 μs, all remotes preferably determine the best pair with only a 1% overhead, independent of the number of remotes.

For example, in time division duplex operation, the same frequency channel is time-shared for reception and transmission. So, in the exemplary embodiment using time division duplex operation, the same pair of antenna array elements (for the best or suitable communication path) is to be used for both transmission and reception. Time-sharing of the channel doubles the data rate as compared to using separate receive and transmit channels. However, the data rate increase does not cause degradation from delay spread, since the use of isolated rays determined by the exemplary embodiment chooses an isolated ray for the best or suitable communication path. Transmission of requests for data as well as pair information; i.e. the best transmit/receive antenna array elements for each remote, involves two optional methods.

A first method has each remote transmitting the pair information and data requests sequentially out of the best antenna array element, with a base monitoring all of the 50 receive antenna array elements, and sufficient guard time is to be used between transmission from each remote so that differences in propagation time do not result in overlapping received signals. For high data rates, the guard times may exceed the information transmission time, for example, with a 1000 ft. radius cell, a 1 μs guard time is used by each remote.

An alternative method allows a second low-data-rate media access channel to be used, with each remote employing the best antenna array element, while the base station may use omnidirectional reception. Accordingly, a single receiver is required at the base station. If the access channel data rate is less than 1 Mbps, omnidirectional reception may be conducted in view of both the delay spread and the signal power evaluation, compensating for the loss of array gain by the lower data rate. A polling method may be used by adapting the polling method disclosed in U.S. Pat. No. 4,789,983, which is incorporated herein by reference, to accommodate bursty and continuous traffic users. In such an adaptation, data transmissions occur on a separate channel to permit the polling procedure to use the entire media access channel. This polling procedure may accommodate at least 500 users with a 1 ms update rate, independent of the number of array elements of each antenna array, and more users may be accommodated if the update rate is less than 1 ms. In addition, only those remotes whose best or suitable communication path; i.e. the best transmit/receive antenna pair, has changed significantly, as well as remotes with data to transmit, need to notify the base station of a change in the communication path. By only transmitting this information the overhead time used may then be reduced and the maximum possible number of users may be increased.

This method requires a receiver for each of the antennas at the remote. To reduce the number of receivers, a polling method with M receiving antenna array elements at each remote may be used. For a base station repeating the bit sequences N times from each base antenna array element, only M/N receivers are required at each remote with these receivers switched between array elements. For example, with M=50 and N=10, only 5 receivers are required for each remote, while the update overhead increases to 10% with 1 ms updates. Using this technique, update overhead can be traded for reduced remote complexity.

In the exemplary embodiments, the first and second units have a plurality of antenna array elements for a high probability of isolating a ray of the signals transmitted therebetween, as a best or suitable communication path, and thereby to attain nearly the full gain of the antennas and eliminate delay spread. By exemplary methods, it has been determined that first and second units having beamwidths in both azimuth and elevation less than 30° for transmission and reception are able to effectively isolate a ray for communications therebetween in a typical office building. Other experiments determined that a beamwidth of transmission and reception of about 13° is preferred to provide effective communications at data rates above 1 Gbps.

In such determinations of beamwidth, the receive signal power margin is evaluated to be:

$$\text{Margin} = \frac{E_b}{N_o} - \frac{E_b}{N_o}\bigg|_{req} \quad (1)$$

where $E_b/N_o$ is the energy per bit to noise density ratio at the receiver, and $$\frac{E_b}{N_o}\bigg|_{req} \quad (2)$$

is the ratio required to achieve a given bit error rate (BER). In particular, $$\frac{E_b}{N_o} = \frac{P_{rec}}{N} \quad (3)$$

where $P_{rec}$ is the received signal power given by:

$$P_{rec} = P_a \cdot L_{CT} \cdot G_t \left[\frac{\lambda}{4\pi}\right]^2 \cdot L_p \cdot G_r \cdot L_{CR} \quad (4)$$

and N is the noise power given by:

$$N = kTB \cdot NF \quad (5)$$

In the above equations, $P_a$ is the power out of the transmit amplifier; $L_{CT}$ is the loss of cable to the transmit antenna; $G_t$ is the transmit antenna gain; $\lambda$ is the wavelength; $L_P$ is the propagation loss relative to 1 meter of free space; $G_r$ is the receive antenna gain; $L_{CR}$ is the loss of cable from the receive antenna; k is Boltzmann's constant=$1.38 \times 10^{-20}$ mW/Hz/° K; T is the system noise temperature; B is the bandwidth; and NF is the noise figure of the receiver.

In the experimental procedures, the following values have been used:

$P_a$=23 dBm, $L_{CT}$=1 dB,
$L_{CR}$=1 dB, T=290° K, and
NF=6 dB.

To communicate with data rates up to 1 Gbps, the carrier frequency is to be in the range of at least 19 GHz, so $\lambda$=c/19 GHz=$3 \times 10^8$ m s$^{-1}$/$1.9 \times 10^{10}$ s$^{-1}$=1.5789 cm.

For typical office buildings, the maximum propagation loss is 60 dB, so $L_P$=60 dB. From the above values and equations, Equation (2) becomes:

$$\frac{E_b}{N_o} = 71 \text{ dB} - 10\log_{10}(B) + G_t + G_r \quad (6)$$

where $G_t$ and $G_r$ are in dB. If a BER of $10^{-8}$ is required with coherent detection of binary phase shift keying (BPSK), then $$\frac{E_b}{N_o} = 12 \text{ dB} \qquad (7)$$

and, using the above equations, the margin is given by:

$$\text{Margin} = 59 \; dB - 10 \log_{10}(B) + G_t + G_r \qquad (8)$$

With isotropic antennas; i.e. $G_t=G_r=0$ dB, the maximum data rate B is about 800 kilobits per second (kbps), which may be improved to about 2 Mbps with the use of coding to permit a higher raw BER to increase the data rate limitation due to power margin.

Such maximum data rate calculations reflect the loss averaged over the multipath fading, with multiple paths from various directions producing fades in signal strength at wavelength intervals. Additional margin with a correspondingly lower data rate is to be taken into account because of such fading. For example, a single receive antenna with Raleigh fading generally requires about 10 dB of additional margin for 90% availability, and about 20 dB additional margin for 99% availability. Such additional margin lowers the data rate limit to 80 kbps and 8 kbps, respectively, for full coverage in a single floor of a building. In addition, at millimeter transmission wavelengths, minor movement of the antenna moves the antenna out of a fade, requiring less additional margin, but environment changes cause such fade avoidance adjustments to be impractical. Further, in such circumstances, a 99% availability may be unacceptable due to short but frequent outages. Diversity may be used to greatly reduce any additional margin, with two receive antennas reducing by half (in dB) the margin required for a given availability.

In addition, the RMS delay spread for many buildings is on the order of 30 ns to 250 ns. Without equalization, a BER<$10^{-8}$ requires an RMS delay spread less than about 10% of the symbol period, resulting in data rate limitations of about 1 Mbps.

Antenna arrays as used in the exemplary embodiment provide an increase in margin. If the multipath causes the received signal to be uniformly distributed in power with respect to angle-of-arrival, increased antenna gain using, for example, a narrower beamwidth, would not increase the margin, where the increase in receive antenna gain is cancelled by the loss of power from the signal outside the beamwidth. Similarly, increased transmit antenna gain does not increase the margin. However, results have shown that the multipath is not uniformly distributed in power with respect to the angle of arrival. Therefore directive antennas generally provide an increase in multipath-averaged received signal power over isotropic antennas, which has been determined to be about within 3 dB of the directive antenna gain. For example, for an antenna with a beamwidth in both azimuth and elevation of θ degrees, the gain for small θ is given by:

$$G = 10 \log_{10}\left[\left(\frac{360}{\theta}\right)^2 \frac{1}{\pi}\right] \qquad (9)$$

Such a beamwidth and gain is obtained by an array of M antennas with a gain of $G=10 \log_{10} M$. For example, from Equation (8) above with $L_p=60$ dB, an antenna gain of $G=26$ dB or, from Equation (9), a 400 element base station array with θ=10° with omnidirectional antennas at the remote units is required to obtain enough receive power to support a data rate of 155 Mbps, assuming there exists a ray with 3 dB less power than the total received signal power. The required gain is given by the product of the gain of the receive and transmit antennas, so similar results are attained using a 100 element base station antenna with θ=20° beamwidth with a four-element remote, or a 20 element array with θ=45° beamwidth at both ends. For example, antenna arrays with 15° beamwidths, using 183 elements, at both the transmitter and the receiver are able to support up to 10 Gbps.

Antenna arrays are also used to reduce the delay spread. Since the data rate limitation due to margin, without an additional fade margin, is substantially equivalent in value with that due to the delay spread with omnidirectional antennas, and since arrays are used to increase the maximum data rate due to the margin limitation, one may expect that an M-element array would increase the data rate limitation due to delay spread by the same factor as the increase due to power margin. With multicarrier or equalization techniques, the data rate may be increased linearly with the number of carriers or length of the equalizer. However, results show that the number of carriers or the length of the equalizer required for a given data rate does not significantly decrease with the beamwidth resulting in complex and expensive techniques for data rates greater than 20 Mbps (until the beamwidth is sufficiently narrow).

To determine an optimal antenna size or beamwidth, the data rate limitation has been evaluated for a single floor of a building being 14 m wide and 118 m long, with a required BER of $10^{-8}$. In this example, the following conditions for the signal propagation models of the power and delay profile of signals are used to select suitable transmission paths using the exemplary embodiment. At the transmitter, an omnidirectional antenna may be used with a gain about 4.5 dB, and a directional antenna may be used with a gain of about 22 dB. The signal format is coherent BPSK, pilot aided, using $2^9-1$ PRBS NRZ. At the receiver, the noise figure is about 6 dB, the bandwidth used is approximately equal to the bit rate, and the required output signal to noise ratio (SNR) for $10^{-8}$ BER is about 12 dB, with antenna gains and cable losses about the same as those of the transmitter.

The propagation model used is the loss in power, relative to 1 m in free space, as given by distance raised to the 3.4 power, with half of the power present in a main ray. That is, with obstructed paths, the power received $P_{rec}$ is:

$$P_{rec} = P_t \left(\frac{\lambda}{4\pi r_0}\right)^2 \left(\frac{r_0}{r}\right)^{3.4} \left(\frac{G_t G_r}{2}\right) \qquad (10)$$

where $r_0=1$ m and $P_t$ is the transmit power.

In addition, the expected omnidirectional received power at about 134 ft. is about −85.8 dBm, and the expected directional received power at about 134 ft. is about −50.8 dBm. At an exemplary data rate of 622 Mbps, neglecting intersymbol interference due to delay spread, the expected omnidirectional antenna margin relative to the required margin for $10^{-8}$ BER is −17.7 dB, and the expected directional antenna margin relative to the required margin for $10^{-8}$ BER is +17.3 dB. Examples of measured BER vs. bit rates for the directional antenna are shown in Table 1 below.

TABLE 1

| Date Bit Rate (in Mbps) | BER |
| --- | --- |
| 622 | 6 × $10^{-8}$ |
| 340 | 1 × $10^{-7}$ |
| 210 | 1 × $10^{-8}$ |

TABLE 1-continued

| Date Bit Rate (in Mbps) | BER |
|---|---|
| 110 | 0 |
| 50 | 0 |
| 10 | 0 |

Figure 6:
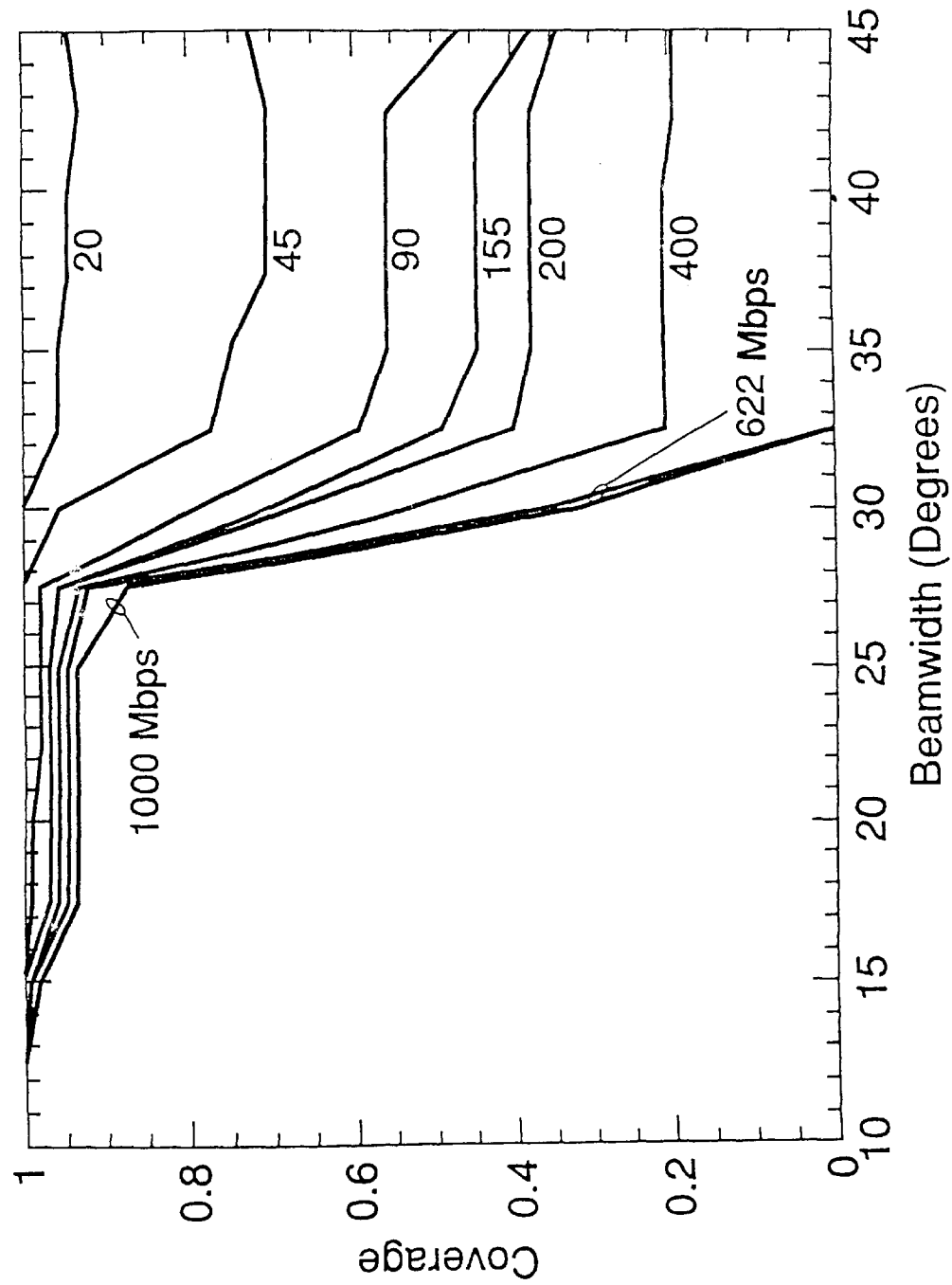
FIG. 6 illustrates exemplary results of availability vs. beamwidth.

For computer modeling of an office building, multipath rays are considered to have up to 3 reflections, with a required receive $E_b/N_o$ of 12 dB and all of the rays within the beamwidth having a RMS delay spread less than 10% of the symbol period. From this model, the results obtained are shown in FIG. 6, with ideal aiming of the antenna beams, and the power output of the power amplifier is about +23 dBm, where the transmitter is positioned in the center of the building and the receiver is in an office at the end of a corridor. As shown in FIG. 6, the availability (or coverage) vs. beamwidth (azimuth and elevation) is plotted for several data rates, with data points taken at 2.5° beamwidth intervals. For data rates greater than 20 Mbps, the availability depends primarily on the beamwidth. Availability greater than 90% requires a beamwidth less than about 30°, requiring about 50 elements in the antenna array, for a data rate of 45 Mbps. As illustrated in FIG. 6, a data rate of 1 Gbps requires only a 25° beamwidth.

If the beamwidth is narrow enough to isolate one ray for 45 Mbps operation, data rates ranging above 1 Gbps may be attained. For a 13° beamwidth; i.e. 244 elements, the maximum data rate exceeds 1 Gbps with 100% availability. Exemplary results from over 60 locations indicate that 13° antennas received an isolated ray with enough power to support Gbps data rates, and about 7 isolated rays with sufficient power are usually detected for each location with a 13° beamwidth.

In an exemplary communications configuration, data is transmitted at about 622 Mbps at a frequency of 19 GHz within a building configuration having a 14 m width and a 118 m length. For this example the transmitter is located in the hallway and the receiver is located within a room off of the hallway of the building. The transmit and receive antennas were 15° beamwidth directive horn antennas capable of being manually scanned.

BER measurements at a combination of 6 locations are conducted by moving the antenna height or lateral position within a few feet at both ends of the link. At each location, both antennas are manually scanned to jointly determine the best transmit and receive angles, where over 33,000 possible transmit/receive angle combinations are possible with 15° beamwidths. The receive antenna is manually scanned to attain a reasonable BER, and the transmit angle is then adjusted slightly to improve this performance. Generally good receive angles are not determined a priori, for example, pointing at a region with less material such as a door does not always result in a satisfactory BER. The strongest receive signal had a propagation loss of about 51 dB, compared to a predicted propagation loss with omnidirectional antennas of 50 dB, which is in agreement with expected results of the strongest ray including about half of the total receive power.

At 622 Mbps, the BER ranged from $3 \times 10^{-8}$ to $10^{-3}$, and a $10^{-3}$ BER is acceptable since coding allows the error rate to be reduced to below $10^{-8}$ BER. BER is nearly constant for data rates greater than 210 Mbps (see Table 1 above), indicating an irreducible BER (albeit a low BER $\leq 10^{-7}$) that is independent of the data rate; i.e. the received signal included one strong ray with much weaker rays with delay spreads in excess of 5 ns. Thus, with sufficient receive power, data rates in excess of 1 Gbps are attained.

While the exemplary embodiment of a wireless communications system and method has been particularly shown and described with reference to the preferred embodiments, it will be understood by those skilled in the art that various modifications in form and detail may be made therein without departing from the scope and spirit of the invention. Accordingly, modifications such as those suggested above, but not limited thereto, are to be considered within the scope of the invention.

What is claimed is:

1. A wireless communications device for indoor communications comprising:
   a plurality of first antenna elements for receiving a plurality of outbound signals on multiple receive antenna beams pointing in both plural respective azimuthal and plural respective elevational directions wherein each said outbound signal is transmitted from a second plurality of antenna elements on a different one of a plurality of outbound antenna beams, said second antenna elements pointing in different azimuthal and elevational directions to facilitate said indoor communications in a multipath indoor environment; and
   a first processor operatively connected to the first antenna elements and responsive to said received outbound signals for determining a suitable indoor communications path between at least one of the first antenna elements and at least one of the second antenna elements with respect to predetermined communications conditions.

2. The wireless communications device of claim 1 wherein each array element of each antenna array has an azimuth and elevation beamwidth of less than about 30°.

3. The wireless communications device of claim 2 wherein the plurality of array elements permit detection of a single multipath ray as the suitable communication path.

4. The wireless communications device of claim 2 wherein each array element of each antenna array has a beamwidth of about 13°.

5. The wireless communications device of claim 1 wherein the first processor, using the suitable communication path, is capable of wireless communications with high data rates in excess of 10 Megabits per second.

6. The wireless communications device of claim 1 wherein the antenna array includes an adaptive antenna array.

7. The wireless communications device of claim 1 wherein the first processor determines the suitable communication path between a plurality of rooms.

8. The wireless communications device of claim 1 wherein the processor determines the suitable communication path to establish indoor wireless communications.

9. The wireless communications device of claim 1, wherein said suitable indoor communication path is a path between only one of the first antenna elements and only one of the second antenna elements.

10. The wireless communications device of claim 1, wherein said plurality of first antenna elements comprise an antenna array that forms a plurality of beams to provide said multiple beam coverage, with each beam being formed with all of said first antenna elements.

11. A wireless communications system comprising:
   a) a base station including:
      i) a plurality of first antenna elements for providing multiple coverage in the azimuthal and elevational directions; and ii) a first processor operatively coupled to the first antenna elements such that outbound signals are transmitted in a sequence on respective first antenna beams;

b) a plurality of remotes, each remote including:

i) a plurality of second antenna elements arranged to form multiple second antenna beams in the azimuthal and elevational directions and for exchanging signals with the plurality of first antenna elements of the base station;

ii) a plurality of mixers, each of said mixers coupled to respective one of the plurality of second antenna elements;

iii) a weight generator coupled to each of the plurality of mixers and applying a weight via the plurality of mixers to signals received by the plurality of second antenna elements to generate weighted signals;

iv) an adder coupled to the weight generator for summing the weighted signals to generate a received signal; and v) a second processor for receiving the received signal from the adder and providing a profile for each of said plurality of second antenna elements for determining a suitable communication path between the base station and the respective remote with respect to predetermined communications conditions.

12. The wireless communications system of claim 11 wherein each array element of each antenna array has an azimuth and elevation beamwidth less than about 30° to permit high data rate communications between the base station and at least one remote in excess of 10 Megabits per second.

13. The wireless communications system of claim 12 wherein each array element of each antenna array has a beamwidth of about 13°.

14. An indoor wireless communications system comprising:

a plurality of units, including a base station and a plurality of remotes;

wherein each of the plurality of units includes:

an antenna array having a plurality of array elements of a predetermined beamwidth for multiple coverage in the azimuthal and elevational directions and for exchanging signals with the antenna array of another unit; and a processor operatively connected to the antenna array and responsive to the exchange of signals for determining a suitable indoor communication path between the base station and the plurality of remotes with respect to predetermined communications conditions, including propagation losses of about 60 dB relative to one meter.

15. The wireless communications system of claim 14, wherein:

said suitable communications path comprises a single one of said first antenna beams and a single one of said second antenna beams;

said given remote is operative to transmit a response signal to the base station indicative of which first antenna beam corresponds to the single first antenna beam of the suitable communications path; and said base station being responsive to said response signal to transmit communication signals to said given remote only on said single first antenna beam.

16. A method for providing indoor wireless communications comprising the steps of:

generating exchange signals at first and second processors;

exchanging the exchange signals between respective antenna arrays of the first and second processors;

receiving a transmitted signal among the exchange signals at the antenna array of the first processor having a plurality of array elements for multiple beam coverage in both azimuthal and elevational directions; and processing the received signal at the first processor operatively connected to the antenna array to determine, from the received signal exchanged by the second processor, a suitable indoor communication path for wireless communications with respect to the array elements and predetermined communications conditions.

17. The method of claim 16 wherein the step of processing the received signal includes determining the suitable communication path with respect to sufficient power and delay spread conditions as the predetermined conditions.

18. The method of claim 16 further including the steps of:

sequentially transmitting a respective predetermined bit sequence from each of a first plurality of antenna array elements of a first antenna array of a first unit;

receiving the predetermined bit sequences at each of a second plurality of antenna array elements of a second antenna array of the second unit;

the step of processing the received signal includes the steps of:

determining a first antenna array element of the second antenna array which receives at least one bit sequence meeting the predetermined signal propagation conditions; and determining a second array element of the first antenna array corresponding to the received at least one bit sequence.

19. The method of claim 16 wherein the step of receiving includes the step of receiving the transmitted signal at an adaptive array; and the step of determining includes the step of adapting a reception configuration of the adaptive array to provide an increased reception by suitable communication path.

20. A wireless communications system comprising:

a) a base station including:

i) a plurality of first antenna elements for forming a plurality of first antenna beams; and ii) a first processor operatively coupled to the first antenna elements such that outbound signals are transmitted in a sequence on respective ones of said first antenna beams;

b) a plurality of remotes, each remote including:

i) a plurality of second antenna elements arranged to form multiple second antenna beams;

ii) a plurality of mixers, each of said mixers coupled to a respective one of the plurality of second antenna elements;

iii) a weight generator coupled to each of the plurality of mixers and applying a weight via the plurality of mixers to signals received by the plurality of second antenna elements to generate weighted signals; and iv) an adder coupled to the weight generator for summing the weighted signals to generate a received signal; and v) a second processor operatively connected to the adder for receiving the received signal and determining a suitable communication path between the base station and the respective remote with respect to predetermined communications conditions; wherein:

said suitable communications path is an indoor communications path;

said plurality of first antenna beams comprises plural azimuthal antenna beams and plural elevational antenna beams; and said plurality of second antenna beams comprises plural azimuthal antenna beams and plural elevational antenna beams a) a base station including:
    i) a plurality of first antenna elements for forming a plurality of first antenna beams; and
    ii) a first processor operatively coupled to the first antenna elements such that outbound signals are transmitted in a sequence on respective ones of said first antenna beams;
  b) a plurality of remotes, each remote including:
    i) a plurality of second antenna elements arranged to form multiple second antenna beams;
    ii) a plurality of mixers, each of said mixers coupled to a respective one of the plurality of second antenna elements;
    iii) a weight generator coupled to each of the plurality of mixers and applying a weight via the plurality of mixers to signals received by the plurality of second antenna elements to generate weighted signals; and
    iv) an adder coupled to the weight generator for summing the weighted signals to generate a received signal; and
    v) a second processor operatively connected to the adder for receiving the received signal and determining a suitable communication path between the base station and the respective remote with respect to predetermined communications conditions.

21. The wireless communications system of claim 20, wherein:

said suitable communications path comprises a single one of said first antenna beams and a single one of said second antenna beams;

said given remote is operative to transmit a response signal to the base station indicative of which first antenna beam corresponds to the single first antenna beam of the suitable communications path; and said base station being responsive to said response signal to transmit communication signals to said given remote only on said single first antenna beam.

* * * * *